Aug. 23, 1927.
H. G. WINTER
1,640,304
TROLLEY WHEEL RETAINER
Filed Aug. 31, 1926
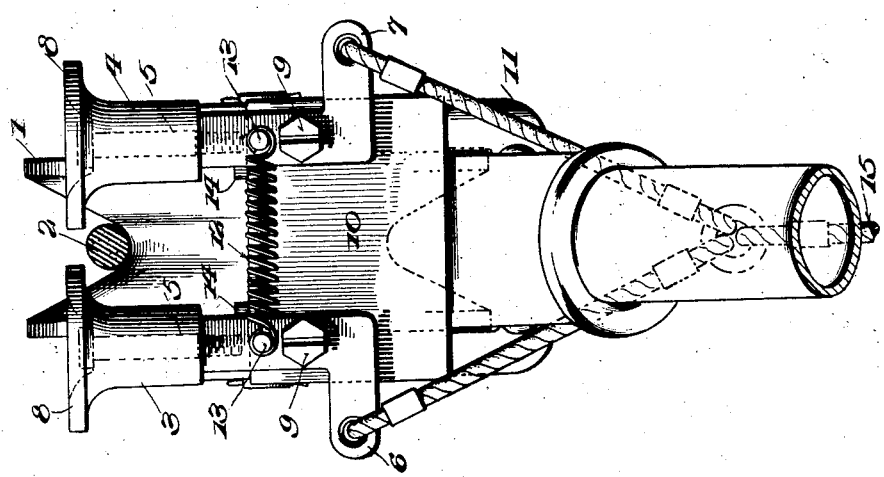
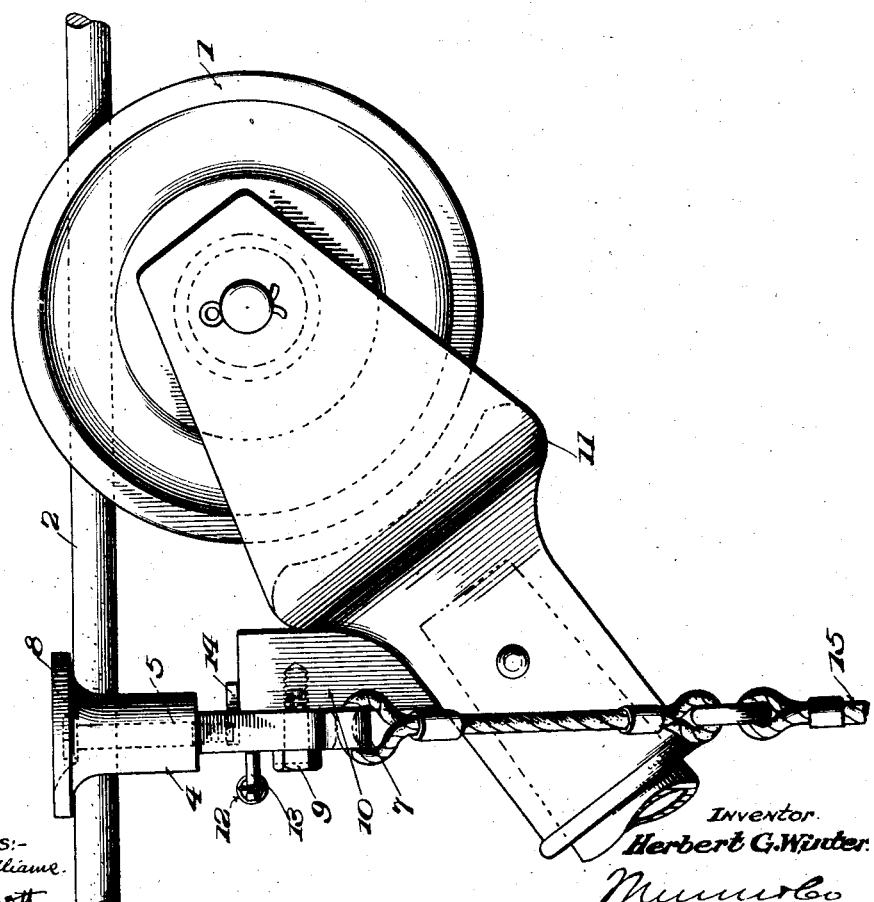

Patented Aug. 23, 1927.

1,640,304

UNITED STATES PATENT OFFICE.

HERBERT G. WINTER, OF PITTSBURGH, PENNSYLVANIA.

TROLLEY-WHEEL RETAINER.

Application filed August 31, 1926. Serial No. 132,834.

This invention relates to improvements in trolley wheels, an object being to provide an attachment to a portion of the wheel fork arranged to form a guard around the trolley wire and thus keep the wheel in place while running.

Other objects and advantages appear in the following specification, reference being had to the accompanying drawing, in which:—

Figure 1 is a side elevation of a trolley wheel and frame illustrating the attachment in use, and Figure 2 is an end elevation.

As indicated by the foregoing brief statement of the invention it is the purpose of the attachment to retain the trolley wheel 1 in contact with the wire 2. It is a common experience to those having to do with apparatus deriving current from overhead wires by means of trolleys, to have the wheel "jump" to wire. The attachment forms a guard preventing such jumping.

To this end provision is made of a pair of rollers 3 and 4 revolubly mounted upon headed pins or screws 5 which are suitably affixed to the upstanding arms of a pair of bell-cranks 6 and 7. The rollers have relatively large disk-like flanges 8 which, when the attachment is operative (Fig. 2), act as guards above the wire and serve as checks to the ready escape of the wheel from the wire.

Screws 9 or other suitable means provide pivotal mountings for the bell-cranks upon a base 10 either formed integrally with or applied to the fork or clevis 11. A stout spring 12 (Fig. 2) has the ends attached to studs 13 upon the bell-cranks, pulling the bell-cranks against stops 14 and limiting the closing movement of the rollers and guard flanges around the wire. The spring 12 is of sufficient strength to prevent yielding of the bell-cranks under any ordinary pressure of the flanges 8 against the wire as when the trolley is in operation.

Holes in the ends of the free arms of the bell-cranks permit the attachment of the trolley rope 15 which is suitably divided to reach both bell-cranks. A pull upon the rope will rock the bell-cranks to displace the guard rollers and flanges from range of the wire 2 and at the same time pull the trolley fork down to remove the wheel from the wire.

While the construction and arrangement of the trolley wheel retainer is that of a generaly preferred form, obviously modifications and changes may be made without departing from the spirit of the invention or scope of the claim.

I claim:

In a trolley wheel retainer, the combination with a wheel fork and wheel, of a block mounted on the fork, a pair of bell crank levers pivoted on the block including vertical arms and horizontal arms, flanged rollers journaled on the upper ends of the vertical arms, a relatively heavy contractile spring connecting said arms and retaining the flanges of the rollers in operative position to engage a trolley wire and prevent accidental disengagement of the wheel from the wire, the block including stop means against which the vertical arms are held by the spring, the horizontal arms of the bell cranks extending laterally beyond the block and being formed with means engageable with an operating rope, a trolley pole rope including branches engaged with said horizontal arms and acting through the arms to spread the rollers against the action of the spring and to transmit a downward pull to the trolley wheel through the intermediacy of the spring when it is desired to disengage the wheel.

HERBERT G. WINTER.